Figure 1:
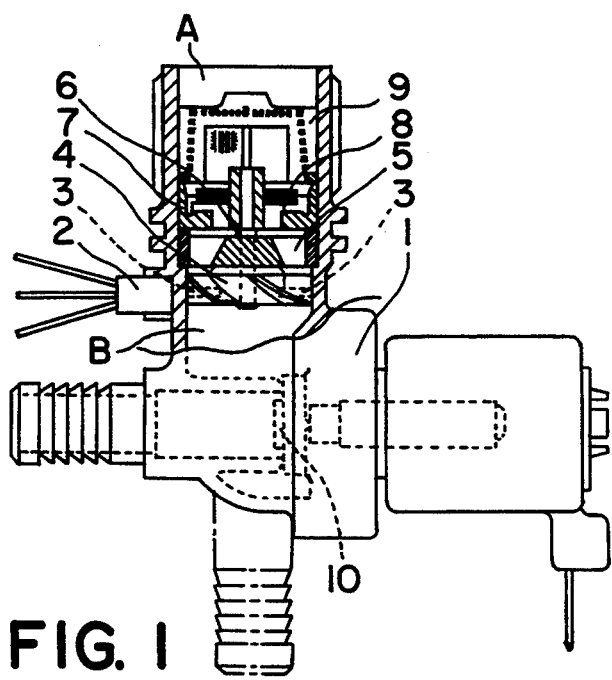

United States Patent [19]
Luigi

[11] Patent Number: 5,429,272
[45] Date of Patent: Jul. 4, 1995

[54] DEVICE FOR CONTROLLING, BY MEANS OF AN ELECTROVALVE, THE VOLUME LIQUID FLOWING TO A RECEPTACLE

[75] Inventor: Sassone Luigi, Alessandra, Italy

[73] Assignee: Eltek S.p.A., Italy

[21] Appl. No.: 891,217

[22] Filed: May 29, 1992

[30] Foreign Application Priority Data

Jun. 6, 1991 [IT] Italy .................. TO91A0428

[51] Int. Cl.⁶ ............................................. B67D 5/30
[52] U.S. Cl. ...................................... 222/14
[58] Field of Search ................. 222/14, 20; 364/570

[56] References Cited

U.S. PATENT DOCUMENTS

| | | |
|---|---|---|
| 3,002,384 | 10/1961 | MacDonald et al. |
| 3,053,087 | 9/1962 | Waugh. |
| 3,164,020 | 1/1965 | Groner et al. |
| 3,937,362 | 2/1976 | Salmijak et al. ............. 222/20 |
| 4,057,173 | 11/1977 | Tal ................................ 222/20 |
| 4,428,088 | 1/1984 | Getz et al. .................... 8/158 |
| 5,007,453 | 4/1991 | Berkowitz et al. ........... 137/458 |

FOREIGN PATENT DOCUMENTS

| | | |
|---|---|---|
| 2607248 | 5/1988 | France. |
| 2508927 | 9/1976 | Germany. |
| 2629766 | 1/1978 | Germany. |
| 4111001 | 9/1992 | Germany. |
| 618414 | 2/1949 | United Kingdom. |

*Primary Examiner*—Jesus D. Sotelo
*Attorney, Agent, or Firm*—Levine & Mandelbaum

[57] ABSTRACT

Integrated device for controlling the volume of fluids flowing through electrovalves, fop liquid distributing machines, comprising: an electrovalve (10); an impeller (4) inserted in a duct (B) for the passage of fluids, provided with one or more radial exciters, such as permanent magnets, an outside detector of the angular position of the exciters and a transductor electrically connected to the electrovalve which controls the passage of the liquid, particularly for washing machines.

8 Claims, 3 Drawing Sheets

DEVICE FOR CONTROLLING, BY MEANS OF AN ELECTROVALVE, THE VOLUME LIQUID FLOWING TO A RECEPTACLE

DESCRIPTION

Various systems are known for controlling the volume of liquids and fluids in general which flow through ducts having a prefixed capacity, so as to exactly control the quantity arriving from a source into other containers or anyway flowing from an outside source.

The purpose of the invention, though not limitative, is the construction of an integrated, alternative device comprising all the organs necessary for controlling the precise volume of the water flowing into the tanks of washing machines or liquid distributing machines in which, as is known, such a control is usually made by the use of a pressure metering device, commonly called pressure switch. Such devices generally comprise an elastically deformable membrane or another such organ sensitive to the variations of pressure, subjected to the pressure of a column of air or water. When the level of the water in the washing tank of the machines reaches the prefixed limit the deformation of said membrane causes the closure of an electric switch which, in turn, closes the known electrovalve which presides the flow of water into the tank of the machine.

These known devices, as well as the various operations of cabling and installation may present several functional problems, such as:

the possible blockage of the duct carrying air or water to the expansion vessel associated to the elastic membrane;

the possible hardening of the elastic membrane with the consequent delay in the operation of the electrovalve.

As stated above, the main purpose of the invention is to provide an integrated device for the exact control of the volume of liquids, which offers maximum reliability and precision and, at the same time, has a simple structure and is economically convenient.

The device according to the invention also has the purpose of considerably facilitating the intervention of the electrovalves, guaranteeing the functionality and the precision of operation in that said operation is no longer subjected to the chancy possibility of reaching an uncertain level of liquid flowing in but is rather subject to a prefixed volume of said liquid. An example can be found in washing machines in which the volume of water arriving in the washing tank is no longer inversely proportional to the entity of the space taken up by the contents to be washed present in the tank which, uncontrollably, alter the level and therefore the quantity of water sent into the tank.

In view of the above stated purpose the device according to the invention is characterised by the fact that it comprises a free impeller, inserted into the duct through which the liquid flows, radially provided with one or more elements capable of exciting an outside sensor associated to a transductor which can be rated and which, following a prefixed number of impulses received, causes the closure of an electrovalve which intercepts the flow of the liquid through the controlled duct, as well as the activity of other accessory devices such as acoustic and/or luminous warning devices, discharge pumps and any other such devices.

Figure 2:
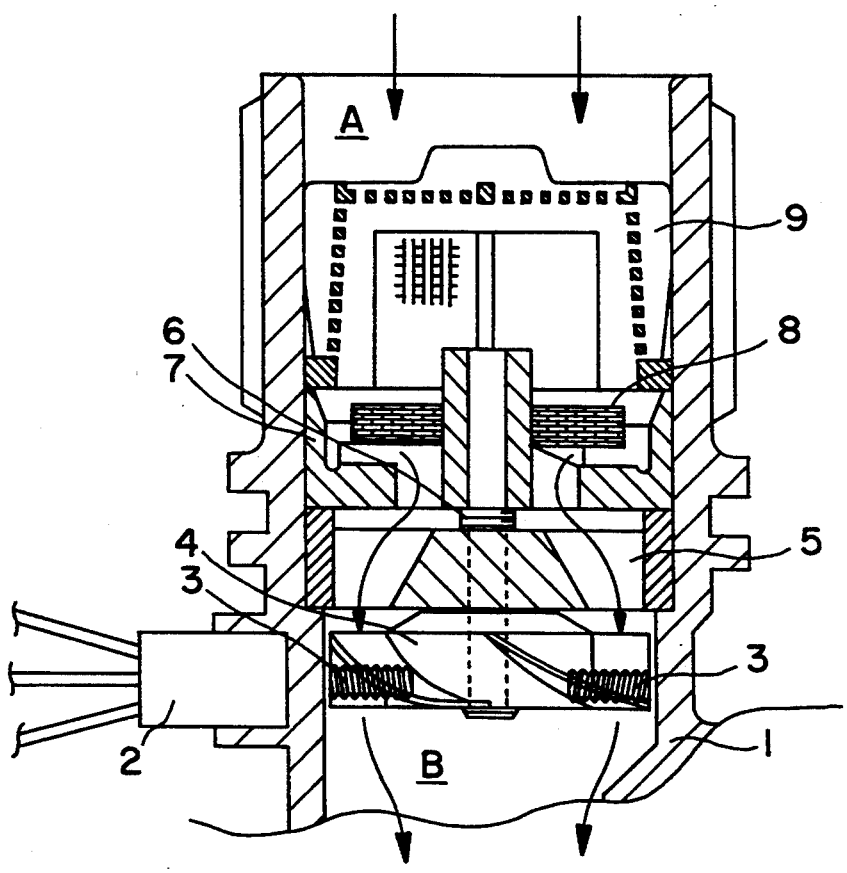
Figure 2A:
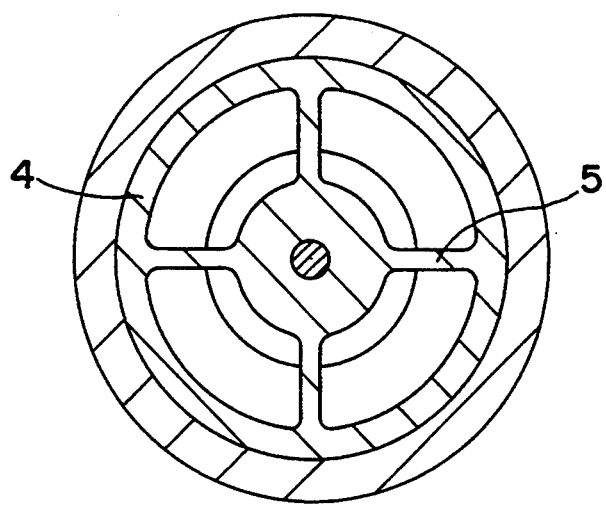
Figure 3:
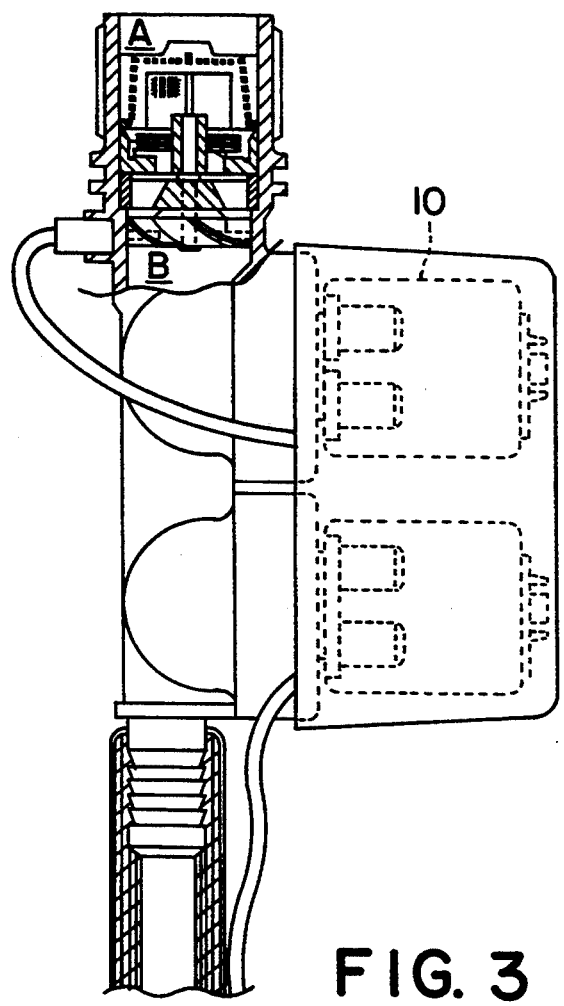
Figure 4A:
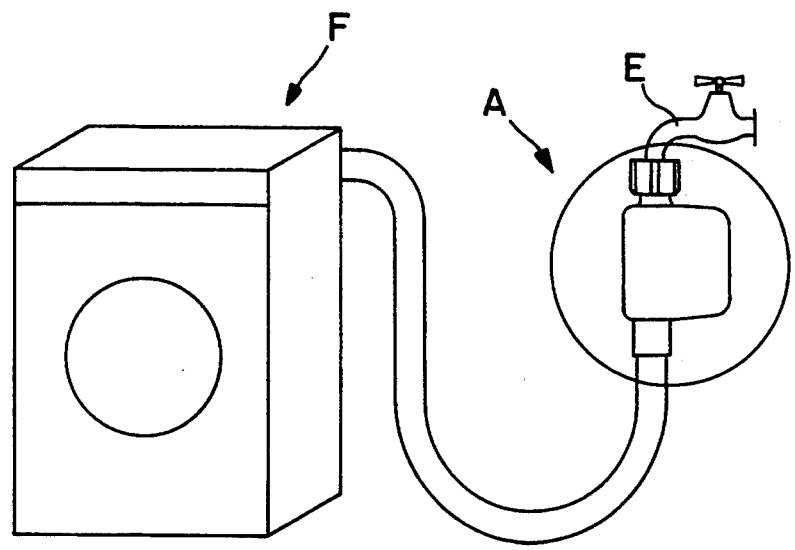
Figure 4B:
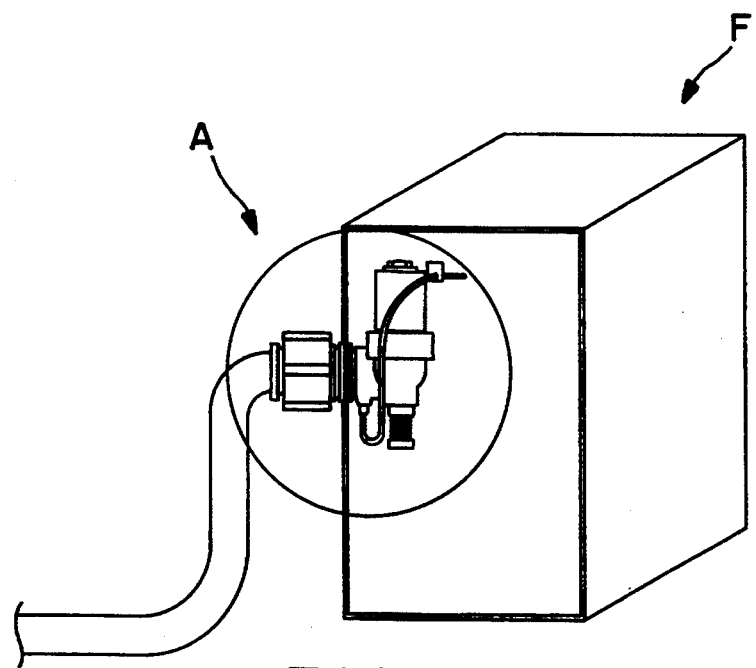

Further characteristics of the device are described below with reference to the schematic drawings attached for greater clarity, in which:

FIG. 1 is an elevated view of a one- or two-way hydraulic electrovalve, with the detecting device applied upstream;

FIG. 2, on a larger scale, is a longitudinal section of the device on its own;

FIG. 2a is a transverse section of same, made along the line II—II of FIG. 2;

FIG. 3, similar to FIG. 1, on a different scale, illustrates the device applied to the top of an electrovalve with a discharge course;

FIG. 4a schematically illustrates the device applied directly downstream of a water intake point connected to the water mains, to feed a washing machine, plate washing machine or liquid distributing machine;

FIG. 4b also schematically illustrates the device, applied to the inside of the housing of any washing machine, plate washing machine or liquid distributing machine.

In the drawings, in FIGS. 1, 2, 2a, -A- indicates a hollow body, in non-magnetic material, such as any suitable synthetic material, which can be connected to a water source; 9 indicates a removable filter for cleaning purposes.

A flow regulator is mounted downstream of the filter 9 said regulator comprising a passage 7 and an elastically deformable membrane 8, these organs both being known.

According to the device, under the flow regulator 7, 8, a diffuser 5 is mounted coaxially with a coaxial pin 6 which supports, rotatable and loose, an impeller 4 with helicoidal blades.

On one or more of the blades of the impeller 4, elements 8 are applied, such as magnets of a permanent or similar nature, cooperating with an active or passive sensor-detector 2. The elements 8 are constituted, for example, by permanent magnets, by metal tips or may be constituted by the impeller 4 itself, provided with at least one dielectric diamagnetic radial sector.

The water flowing in -B- sets the impeller 4 into angular movement therefore the elements 3, placed on the blades of said impeller, interfere with the angular position of the sensor 2 in which they generate instantaneous impulses. In any case the impulses generated in the sensor 2 are transmitted by same to an electronic unit, not illustrated, which processes them and transforms them into an electric signal. This signal, on the basis of the revolutions/volume ratio, determines the quantity of water passing in -B-.

Once the prefixed volume of water has been reached, the electronic units causes the electrovalve 10 to close. The closure of the electrovalve intercepts the water flow in -B-. The device guarantees that the precise prefixed volume of water arrives in the tank of washing machines, without any excess or deficiency in quantity, however cumbersome the presence in the tank of clothes or other objects may be.

In the case of breakdowns, accidental flooding and/or disorders caused by an excessive or insufficient volume of water are avoided, such problems being attributed to the stoppage of the filter 9, to the lack of, or insufficient distribution of water in the mains, to the abnormal function or breakdown of the flow regulator 8 with the consequent excessive flow of water.

In FIG. 1 the device cooperates with a two-way -C, D- electrovalve 10.

In FIG. 3 the device is applied in combination with a one-way discharge flow electrovalve 10. In FIG. 4a the device is applied directly downstream of a water mains point -E- for a washing machine -F-. In both these cases total safety conditions against flooding are obtained.

In FIG. 4b, the same device is mounted on the top of the electrovalve and inside the housing -G- of any kind of washing machine.

In the various possible solutions, as regards the radial positioning of the sensor 2 with respect to the impeller 4 and to the electrovalve 10, which organs constitute a single block, the dimensions of the unit as a whole are always advantageously reduced and compact therefore minimum assembly space is required for use.

From what has been described above, it is clear that the use of the device is advantageous in all cases where it is necessary to control the exact volume of a liquid flowing from a tank and sent on into various containers, as in all liquid distributing machines, as well as for the control of the water sent into the tanks of washing machines in general.

The scope of the invention is not limited to what has been described and illustrated above as examples, but can be extended to comprise any other similar or equivalent solution which is conceptually based on the characteristics set forth above.

I claim:

1. A device for controlling the volume of liquid flowing from a source of the liquid to a receptacle, the device comprising:
   a hollow body having an inlet port adapted to be connected to the liquid source and an outlet port adapted to be connected to the receptacle,
   an electrically-controlled valve for alternatively permitting and preventing flow of liquid to the receptacle,
   an impeller within the body between the inlet and outlet ports, the impeller being rotatable by liquid flowing through the body from the inlet port to the outlet port,
   means for producing an electrical signal representative of the number of rotations experienced by the impeller, and hence the volume of liquid flowing through the body,
   means responsive to the electrical signal for operating the valve to close the latter and prevent further liquid flow to the receptacle, and
   flow regulator means within the body for providing a constant rate of liquid flow to the impeller regardless of the pressure of the liquid flowing from the source.

2. A device as defined in claim 1 wherein the flow regulator means comprises an annular wall, within the body, defining a restricted passageway coaxial with the impeller, and an elastically deformable membrane coaxial with the passageway and cooperable with the annular wall to decrease and enlarge, respectively, the flow area through the body in response to increases and decreases in the liquid source pressure.

3. A device as defined in claim 1, including a diffuser within the body, upstream of the impeller, for spreading the flow of liquid to the impeller so as to direct the liquid flow against a region of the impeller spaced radially outwardly from the impeller axis.

4. A device as defined in claim 3, wherein the diffuser is coaxial with the impeller, and has a frusto-conical shape diverging toward the impeller.

5. A device as defined in claim 1, including a removable filter within the inlet port.

6. A device for controlling the volume of liquid flowing from source of the liquid to a receptacle, the device comprising:
   a hollow body having an inlet port adapted to be connected to the liquid source and an outlet port adapted to be connected to the receptacle,
   an electrically-controlled valve for alternatively permitting and preventing flow of liquid to the receptacle,
   an impeller within the body between the inlet and outlet ports, the impeller being rotatable by liquid flowing through the body from the inlet port to the outlet port,
   means for producing an electrical signal representative of the number of rotations experienced by the impeller, and hence the volume of liquid flowing through the body,
   means responsive to the electrical signal for operating the valve to close the latter and prevent further liquid flow to the receptacle, and
   a diffuser within the body, upstream of the impeller, for spreading the flow of liquid to the impeller so as to direct the liquid flow against a region of the impeller spaced radially outwardly from the impeller axis.

7. A device as defined in claim 6, wherein the diffuser is coaxial with the impeller, and has a frusto-conical shape diverging toward the impeller.

8. A device as defined in claim 6, including a removable filter within the inlet port.

* * * * *